(12) United States Patent
Eldridge et al.

(10) Patent No.: US 7,100,165 B2
(45) Date of Patent: Aug. 29, 2006

(54) METHODS AND SYSTEMS FOR SYNCHRONIZING PROCESSES EXECUTING ON A DIGITAL DATA PROCESSING SYSTEM

(75) Inventors: Keith E. Eldridge, E. Taunton, MA (US); Dennis M. Bushy, Franklin, MA (US)

(73) Assignee: Invensys Systems, Inc., Foxboro, MA (US)

( * ) Notice: Subject to any disclaimer, the term of this patent is extended or adjusted under 35 U.S.C. 154(b) by 647 days.

(21) Appl. No.: 10/252,835

(22) Filed: Sep. 23, 2002

(65) Prior Publication Data

US 2003/0051068 A1    Mar. 13, 2003

Related U.S. Application Data

(63) Continuation of application No. 08/846,756, filed on Apr. 30, 1997, now abandoned.

(51) Int. Cl.
*G06F 9/46* (2006.01)
*G06F 9/00* (2006.01)
*G05B 11/01* (2006.01)

(52) U.S. Cl. .................. 719/316; 700/19; 700/20; 715/700

(58) Field of Classification Search ............. 707/1, 707/8; 717/127; 719/316; 700/19, 20; 715/700
See application file for complete search history.

(56) References Cited

U.S. PATENT DOCUMENTS 5,325,522 A * 6/1994 Vaughn .................. 707/1
5,621,672 A * 4/1997 Kobayashi et al. ............ 700/5
5,636,376 A * 6/1997 Chang ..................... 717/127
5,734,902 A * 3/1998 Atkins et al. .............. 719/316
5,790,829 A * 8/1998 Flynn ....................... 703/17

OTHER PUBLICATIONS

Data Integrity by Central Data Management, May 1, 1990, vol. 32.*

* cited by examiner

*Primary Examiner*—Meng-Al T. An
*Assistant Examiner*—Camquy Truong
(74) *Attorney, Agent, or Firm*—David J. Powsner; Nutter McClennen & Fish LLP (57) ABSTRACT

A method and system for synchronizing plural processes executing on a digital data processing system includes the steps of registering each of the processes for notification of at least selected events occurring in the other processes. Those events can include, for example, the addition, deletion or selection of an item in another process, the selection of the menu item in the graphical user interface of another process, and the invocation or termination of another process. An item is any informational entity in a process, such as the datum or display object. The method and system further detect an event in any of the processes and determining whether that event is one for which the process (other than bat in which the event occurred) is registered for notification. If so, that other process is notified of the event, e.g., so that it can take an action based on that effected in connection with the detected event in the process in which it occurred.

20 Claims, 12 Drawing Sheets

METHODS AND SYSTEMS FOR SYNCHRONIZING PROCESSES EXECUTING ON A DIGITAL DATA PROCESSING SYSTEM

This application is a continuation of U.S. Ser. No. 08/846,756, entitled METHOD AND SYSTEMS FOR SYNCHRONIZING PROCESSES EXECUTING ON A DIGITAL DATA PROCESSING SYSTEM, filed on Apr. 30, 1997, now abandoned, the teachings of which are incorporated herein by reference (including, specifically, for example, FIGS. 6a–8b thereof, which provide more legible copies of those same-numbered figures hereof).

BACKGROUND OF THE INVENTION

The invention pertains to digital data processing and, more particularly, methods and systems for synchronizing processes executing on a digital data processing system.

Early computer programs were typically written for "stand-alone" operation. Since most computers had limited processor and memory resources, they could execute only a single sequence of instructions at a time. Although databases and other resources were sometimes shared among multiple programs, they were typically executed at different times and, often, by different users. Thus, for example, personnel in the bookkeeping department might use one program to enter records into a computerized accounting log, while the personnel in the accounting department would use another program to print that log. As early user interfaces were relatively unrefined, it would not be unusual for those programs to refer to the accounting log and its data in very different ways.

As processor resources increased and interface techniques improved, programmers began writing software packages that operated simultaneously with one another and that displayed and printed shared data on more uniform bases. Developers of these early integrated packages attempted to insure that data files written by one program in a package could be read by another program in that package. Thus, for example, most packages permitted a table generated by a spreadsheet application to be read into the corresponding word processing application. In addition, many packages capitalized on object embedding technologies to "dynamically" link the data files generated by one application program into those of another. For example, a table generated by a spreadsheet application could be embedded in a word processing document so that changes made by the former were automatically included in the later.

A problem with prior art integrated packages is that they are not sufficiently integrated. For example, although data generated by one application can be dynamically linked into another, both applications typically cannot modify that data. Instead, current technologies restrict modification to the "source" application, i.e., the application that generated the data in the first instance. In addition, only the source application can format an embedded item. Thus, for example, the arrangement of a table that is dynamically embedded into a word processing document is restricted to the spreadsheet application that created that table.

An object of this invention is to provide improved digital data processing methodologies and, more particularly, improved methods for synchronizing processes executing on a digital data processing system.

A related object of the invention is to provide such methods as are suited for processes that share common data or that maintain corresponding data sets.

Another object upset of the invention use to permit such synchronization regardless of whether the processes are executing on the same computer or across networked computers.

Still another object of the invention is to provide methodologies that can be implemented at minimum cost for use with a broad range of applications program and across a wide spectrum of hardware and software platforms.

SUMMARY OF THE INVENTION

The foregoing objects are among those attained on the invention which provides, in one aspect, a method for synchronizing multiple processes executing on a digital data processing system, e.g., a single computer or a plurality of computers that are in communication with one another.

The method includes registering each of the processes for notification of at least selected events occurring in the other processes. Those event types can include, for example, item-specific events (e.g., the addition, deletion or selection of an item in another process), menu selection events (i.e., the selection of the menu entry in another process), and the invocation or termination of another process. As used herein, "item" refers to any entity, such as a datum, used or displayed by a process. It can be, for example, an entry, row, or column in a spreadsheet program, an object displayed in a drawing program, a file opened by an editing program, etc.

The method further includes detecting an event in any of the multiple processes and determining whether that event is one for which processes (other than that in which the event occurred) are registered for notification. If so, those other processes are notified, e.g., so that they can take an action consistent with that caused by the detected event in the process in which it occurred.

By way of example, three applications programs executing simultaneously on a computer can register for notification of menu selections (or "picks") occurring in any of the others. When a user selects a menu options (such as FILE-OPEN) in any of the programs, the method notifies the others of that event. In response, they can interrogate a common database or the operating system to determine the specific action taken (e.g., the specific file opened) and, in turn, can take complimentary actions (e.g., opening related files).

By way of further example, an applications program can register for notification of process invocation or termination, e.g., when other programs are opened or exited. As new processes are started or old ones terminated, the registered process can, for example, alter the menu options it provides. More particularly, if a registered process has a menu with options that permit the user to open or switch to another process, that option can be activated or deactivated depending on whether that other process has already been invoked and is active, or whether it has been terminated and is inactive.

Further aspects of the invention provides methods as described above in which a registry, database, or other store is maintained identifying each process and the events of which it is to be notified.

Still further aspects of the invention provides methods as described above in which events occurring in processes are detected by intercepting selected function or subroutine calls made by those processes. This is accomplished with "shell" or "stub" routines having names like those of the functions/subroutines to be intercepted. Thus, for example, where it is known (e.g., as it is in most windowing environments) that processes typically invoke a specified routine in order to obtain menu selections from the user, an interceptor routine of the same name can be linked (e.g., via dynamic linking libraries, or DLL's) prior to linking of the specified routine. Once that interceptor routine is invoked, it can determine the type event and notify the other registered processes accordingly. Thereafter, the interceptor routine can itself invoke the specified routine, thereby, enabling the process in which the event occurred to continue processing in the normal course.

Other aspects of the invention provides methods as described above including the step of detecting data transfer events, such as "drag-and-drop" events, between any of the processes. Drag-and-drop events are events in which a user "drags" an item from the window of a first process to the window of a second process, thereby, causing that information to be added to the second process. Upon detection of a drag-and-drop event, the method determines whether the recipient of that operation is registered to receive data in that manner and, if so, at what site in its "window" and in what format. If the operation proceeds, the method that notifies other processes of the addition of an item to the recipient process. Those other processes can respond, in turn, by adding corresponding items to their own data sets.

Still other aspects of the invention contemplate systems operating in accord with the above-described methodologies for synchronizing multiple processes executing on a digital data processing apparatus.

Yet still other aspects of the invention contemplate articles of manufacture, e.g., magnetic disks, composed of computer usable media embodying a computer program that causes a digital data processing apparatus to synchronize multiple processes executing on such apparatus.

Methods and systems as described above can be advantageously used to synchronize multiple processes executing on a digital data processing system and, if desired, to insure the coherency of data maintained by them. The methods and systems permit all processes to be notified whenever a change is made to one of them so that, for example, as menu selections and item selections are made in one process, they can be mirrored in the other processes. And further, so that data sets independently maintained by each process can be updated for accord with those maintained by the other processes. And still further, so that as items are added to a process, or deleted therefrom, the other processes can update themselves accordingly.

BRIEF DESCRIPTION OF THE DRAWINGS

A further understanding of the invention may be attained by reference to the drawings in which.

DETAILED DESCRIPTION OF THE ILLUSTRATED EMBODIMENT

Operating Environment

Figure 1:
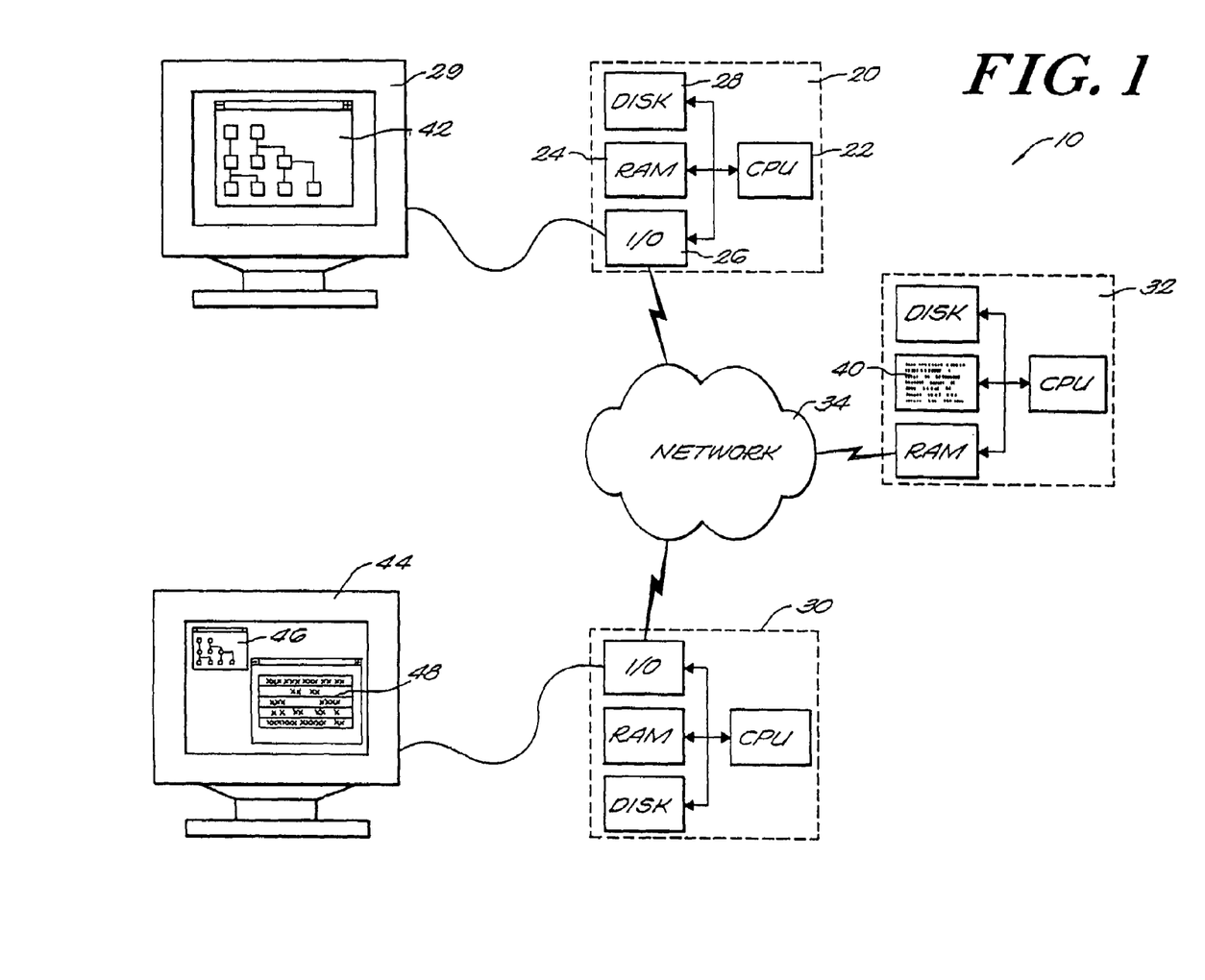
FIG. 1 depicts a digital data processing system of the type in which the invention is practiced.

FIG. 1 depicts a digital data processing system 10 of the type in which the invention is practiced. The illustrated system 10 includes a conventional digital data processor 20 (e.g., a workstation, personal computer, hand-held computing device, etc.) having one or more central processing units 22, main memory 24, input-output system 26, and disk drive (or other mass storage device) 28, all of the conventional type known in the art Digital data processor 20 is coupled to a monitor 29 for the display of output generated by applications programs, operating systems and other software executing thereon. Other output devices, such as printers and plotters (not shown), may also be coupled to digital data processor 20. Likewise, input devices, such as a keyboard and "mouse" (not shown), may be attached to the unit 20 to accept user input.

Illustrated digital data processing system 10 further includes a conventional digital data processor 30, which is coupled to digital data processor 20 via network 34. The digital data processor 30 can also include central processing units, main memory, include-output systems, mass storage devices, monitors, output devices and input devices, as illustrated. The network 34 comprises any conventional digital data processing network (e.g., LAN or WAN), cable television-based network, wireless network and/or any telecommunications-based network capable of supporting communications between digital data processors 20, 30.

The drawing shows another conventional digital data processor 32 which is coupled to digital data processors 20, 30, but which does not execute processes that are synchronized by the invention. Rather, digital data processor 32 supplies data 40 that is displayed and/or manipulated by synchronized processes 42, 46, 48 on digital data processors 20, 30. That data 40 can represent, for example, information regarding a process, device, or combination thereof amenable to modeling or control. Data 40 can be, for example, operational information regarding a process control system of the type conventionally used to monitor and control a manufacturing process. Data 40 can also represent, by way of further example, configuration parameters for digital data processing network of the type used in a conventional corporate environment. Data 40 is supplied to processes 42, 46, 48 over network 34 in the conventional manner. A single copy of that data may reside in the stores of digital data processor 32, although, separate copies of that data can be maintained by each of processes 42, 46, 48 in the memories of their associated digital data processors 20, 30. As FIG. 1 shows, processes 42, 46, 48 synchronized by the invention can operate on, or share, common data supplied by an external source. However, this is not a requirement of the invention—which can synchronize processes regardless of their sources of data and regardless of whether that data is shared.

Synchronized Applications

Processors 20, 30, are programmed in accord with the teachings herein for synchronization of processes 42, 46, 48, executing thereon. In the illustrated embodiment, that synchronization is effected with respect to common data supplied, by way of example, from digital data processor 32. As noted above, the synchronization methodologies discussed herein can be applied regardless of whether the processes 42, 46, 48 operate on common data, corresponding data (i.e., related but not identical data sets), or the like.

As suggested by FIG. 1, processes 42, 46, 48 execute in a "windowing" environment provided under the operating systems of the respective processors 20, 30. Although this is not essential to the invention, such environments can be implemented, for example, under the Windows 95 or Windows NT operating systems, as well as under a variety of other commercially available operating systems.

Within that environment, applications program 42 (executing on digital data processor 20) and applications program 46 (executing on digital data processor 30) display common data (i.e., from processor 32) in a first format. Applications program 48 (executing on digital data processor 30) displays that data in a second format. While those skilled in the art will appreciate that the particular display formats discussed herein and shown on monitors 29, 44 of FIG. 1 are not essential to the invention, they help illustrate the respective functions of the processes 42, 46, 48 being synchronized.

Initialization/Termination of Synchronization Processes and Data Structures

Figure 2:
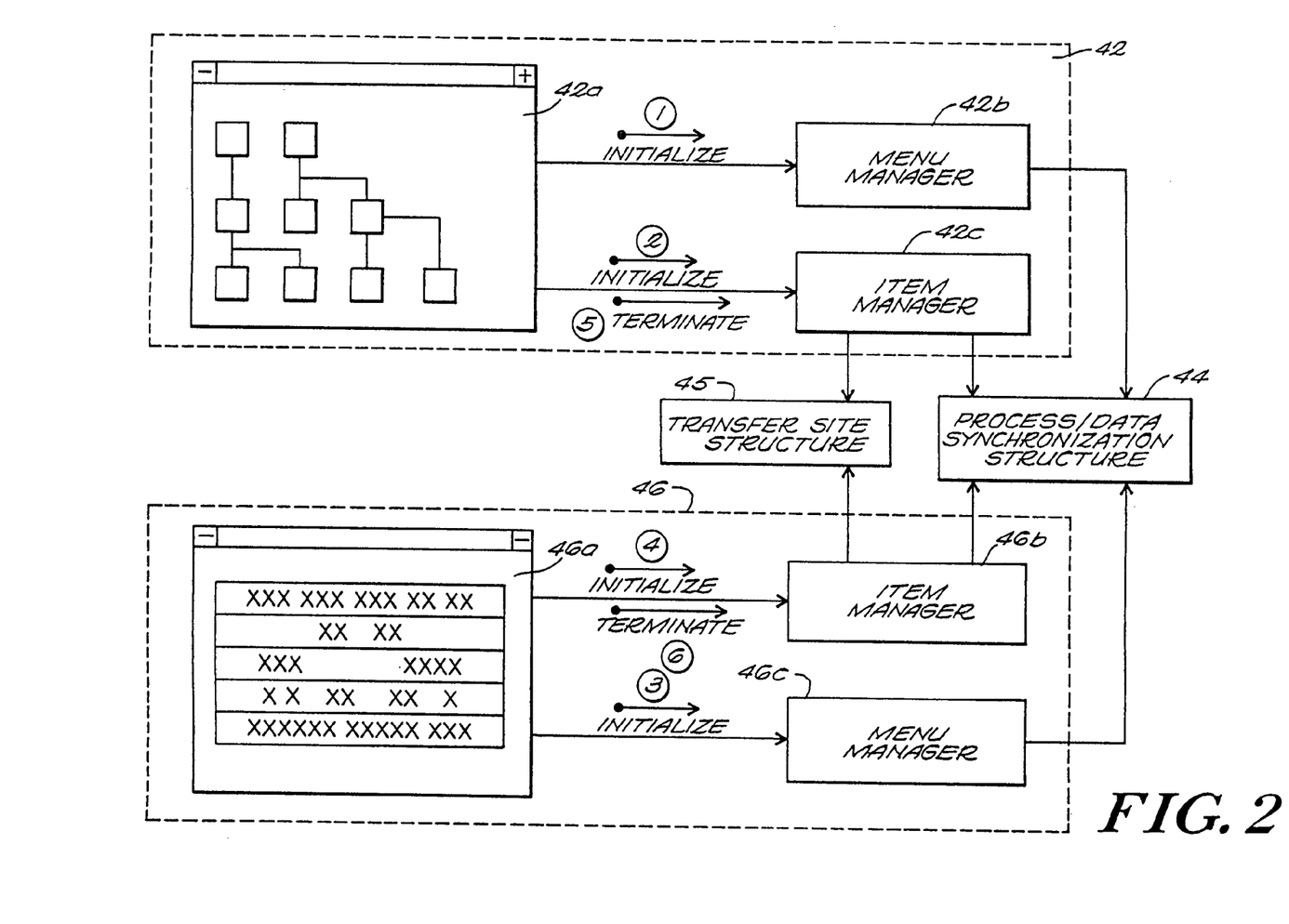
FIG. 2 depicts initialization and termination sequences in a method according to the invention.

FIG. 2 is a modified data flow diagram illustrating initialization and termination of the data structures utilized for synchronization of processes 42, 46, 48 executing digital data processors 20, 30, respectively. Though only two of those processes 42, 46 are illustrated, those skilled in the art will appreciate that the methodologies shown in this and the other drawings, and discussed below, are applicable to any number of other processes, whether they are executing on a single digital data processor or multiple digital data processors.

Referring to the drawing, process 42 comprises applications program 42*a*, as well as a menu manager 42*b* and an item manager 42*c*. The menu manager 42*b* works in conjunction with conventional functionality provided in the windowing API of the digital data processor 20 to display menus, obtain user menu selections and notify the other processes 46 of these selections.

For example, in an embodiment of the invention that utilizes the Windows 95 operating system, the menu manager 42*b* operates in connection with that system's menu resource data structure and the standard Windows 95 menu-generating routines. The menu manager 42*b* does not necessarily define a menu structure itself but, rather, utilizes the structures defined by the applications program 42*b* (and stored, for example, in the menu resource data structure).

At runtime, the menu manager 42*b* utilizes API functions supplied by the operating system to identify menus defined by the applications program 42*a* and to identify those selection events, i.e., menu "picks" made by the user. The menu manager then notifies the other processes of those events (as discussed below in connection with FIG. 3).

In a preferred embodiment, the menu manager 42*b* does this by intercepting selected calls made to the windowing API by the applications program 42*a*. For example, in an embodiment of the invention that operates with Windows 95, the menu manager 42*b* incorporates a function named OnCmdMsg, that intercepts calls made by the applications program 42*a* to the similarly-named API function. That "interceptor" function is dynamically linked to the applications program 42*a* (e.g., via a DLL file) prior to the similarly-named API function.

Hence, at runtime the interceptor function is invoked prior to the API function that would otherwise be called by the applications program 42*a*. As discussed below, once the interceptor function has been invoked, it notifies the other processes 46 of the menu selection events in process 42 and, particularly, in applications program 42*a*.

The menu manager 42*b* also adds, to applications program 42*a*, menu options for every applications program (i.e., other than program 42*a*) that will serve as a menu selection for program 42*a*. Those other applications programs are registered for this purpose by providing, for each of them, a companion file that has the same basic filename as the executable form of the registered program but with a preselected filename extension (e.g., ".mnu"). The menu manager detects those companion files (e.g., by searching for their ".mnu" extensions) and adds corresponding menu options to applications program 42*a*. In each case, the added menu option consists of the contents of the companion file. If the user selects any of those options at runtime, the menu manager invokes the corresponding executable file.

Thus, for example, if the programs EDITOR and CATALOG will serve as menu selections for program 42*a*, they are registered by supplying companion files "editor.mnu" and "catalog.mnu". Upon identifying those files, the menu manager 42*b* adds menu options "editor" and "catalog" to the menu of applications program 42*a*. If either of those options is selected, a corresponding executable file name is constructed from the option name and the appropriate executable extension, e.g.,"editor.exe" and "catalog.exe" in the case of Windows 95, and that file is executed.

With reference to FIG. 2, in step (1), the applications program 42*a* initializes the menu manager 42*b* by invoking its InitializeManager entry point. This causes the menu manager 42*b* to initialize data structures used at runtime, particularly, the process/data synchronization structure 44, which is a common data structure utilized by all processes 42, 46, 48 synchronized by the invention. That structure 44 lists all of the synchronized processes and the types of events of which they are to be notified. Those events can include, for example, menu selection events (i.e., the selection of menu options in a process) and the invocation or termination of another process.

In a preferred embodiment of the invention, the process/data synchronization structure 44 has a structure that is defined as follows:

process identification process type for each notification type, the type of notification desired Upon being initialized by the applications program 42*a*, the menu manager 42*b* updates the process/data synchronization structure to register that process for notification of menu selection events occurring in the other synchronized processes, e.g., process 46. At the same time, the menu manager 42*b* employs the item manager 42*c* to include an instance of program 42*a* in the process/data synchronization structure. Other processes can adjust their own menus using the menu manager and that structure's information, e.g., deactivating menu selections that could otherwise be used to initiate program 42*a*.

With continued reference to FIG. 2, item manager 42*c* works in conjunction with conventional functionality provided in the windowing API of the digital data processor 20 to identify item specific events in the applications program 42*a* and to notify the other processes 46 of the same.

In an embodiment of the invention for use with the Windows 95 operating system, the item manager 42*c* operates in connection with that system's standard API notification input routines, i.e., the routines that identify items acted upon by the user in the window of the applications program 42*a*. Unlike the menu manager, which intercepts calls made by the applications program 42*a* to the windowing system, the item manager 42*c* is directly invoked by the applications program as each item-specific event is detected. Thus, for example, the applications program 42*a* invokes the item manager 42*c* upon each item selection, deselection, addition, deletion or modification.

With continued reference to FIG. 2, in step (2), the applications program 42*a* initializes the item manager 42*b* by invoking its InitializeManager entry point. More particularly, the applications program 42*a* invokes that entry point and specifies whether the program is to be notified of item-specific events, to wit, the addition, deletion or selection of an item in another process. The applications program 42*a* also specifies whether that program 42*a* may receive data via data transfer operations, such as drag-and-drop and/or cut-and-paste operations, and, if so, the permissible format and "drop" site (in the case of drag-and-drop) for such operations. As those skilled in the art will appreciate, a "drag-and-drop" is a common windowing operation wherein data graphically selected in one applications program is "dragged" to another applications program and, thereby, added to that other program. The "drop" site is the location in the recipient applications program to which an icon representing the data is dragged. A "cut-and-paste" is a common windowing operation wherein data selected in one applications program is copied (e.g., via a keyboard or mouse command) to a "clipboard" and, subsequently, "pasted" into another applications program.

Item manager 42*c* stores data transfer information for each process in a common data structure referred to as the transfer site structure 45. In a preferred embodiment of the invention, that structure is defined as follows:
   process identification
   region identification
   ownership indicator
   type of data transfers allowed (e.g., drag-and-drop, cut-and-paste, etc.)

In steps (3)–(4), the applications program 46*a* of process 46 similarly invokes its respective menu manager 46*b* and item manager 46*c* to register the program 46*a* for notification of desired events, e.g., menu selection events, item-specific events, and drag-and-drop events. As above, that registration information is stored in the common data structures 44 and 45.

The processes 42, 46 can be de-registered from synchronization by transmission of termination notice to their respective item managers 42*c*, 46*c*. This causes entries for the respective processes 42, 46 to be removed from the shared structures data structures 44, 45, thus, obviating their notification of further events occurring in the other processes. This is indicated by steps (5)–(6) in the drawing. Upon termination of an applications program, the item managers can notify all other processes of termination of the process. The notified processes could adjust their menu selections accordingly, e.g., by activating or deactivating menu options to invoke the terminated process.

Synchronization via Menu Selection

Figure 3:
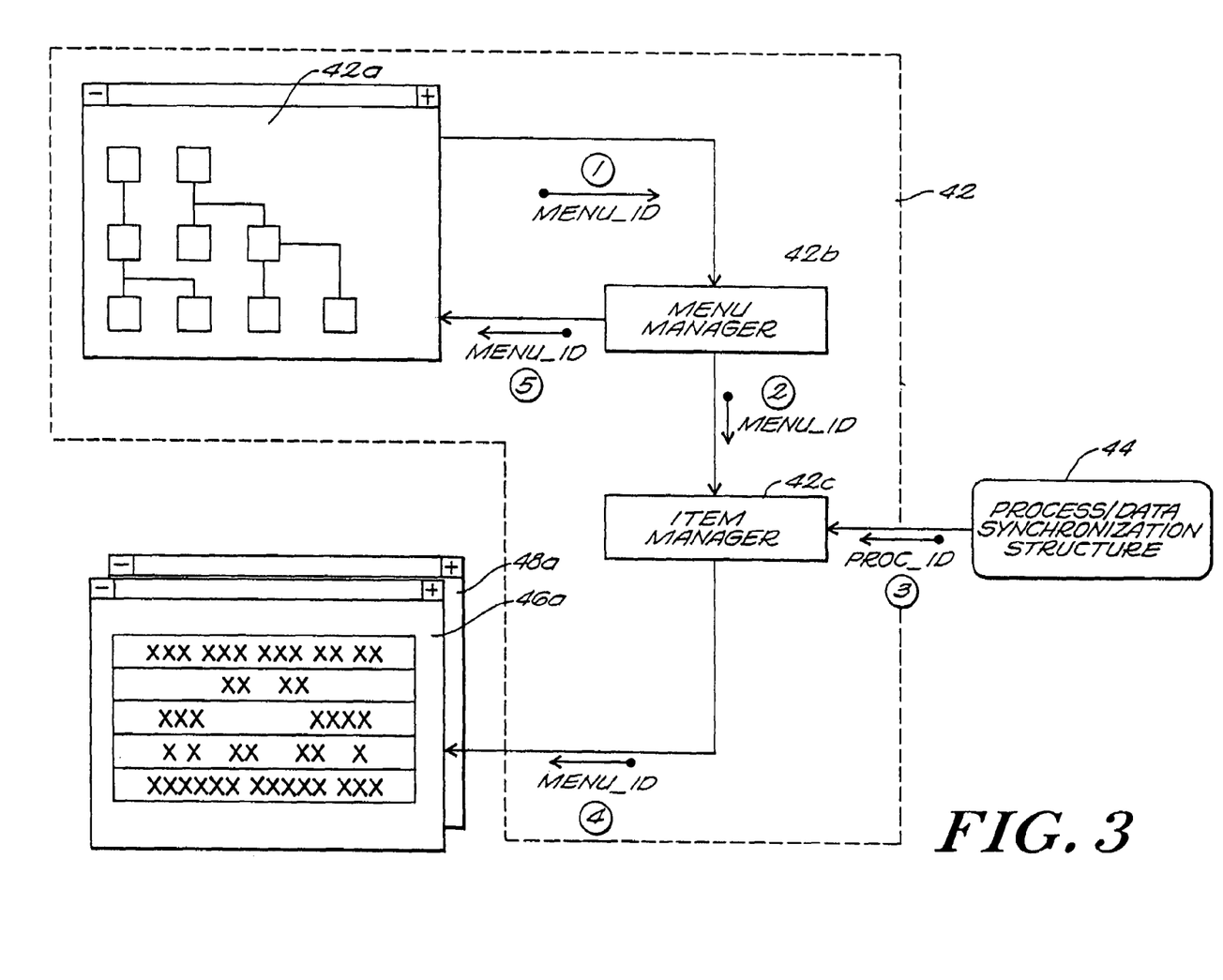
FIG. 3 depicts a menu selection synchronization sequence in a method according to the invention.

FIG. 3 depicts a sequence for synchronizing processes 42, 46 based on a menu selection event occurring in one of the processes, to wit, application program 42*a*. In step (1), the menu manager 42*b* detects a menu selection event arising from the user's selection of a menu item in the applications program 42*a*. Such a selection is intercepted by the menu manager 42*b* in the manner discussed above.

An identification of the menu option chosen by the user is reflected by a value MENU_ID intercepted by the menu manager 42*b*. In a preferred embodiment of the invention, MENU_ID has a commonly-known value representing the type of menu selection chosen by the user, e.g., FILE-NEW, FILE-OPEN, FILE-CLOSE. Those skilled in the art will, of course, appreciate that MENU_D may take on other values reflecting that a menu selection event occurred and/or the type of that event.

In step (2), the menu manager 42*b* passes the MENU_ID to the item manager 42*c* for possible notification of the other applications programs 46, 48. A preferred menu manager 42*b* of the invention does not pass MENU_ID's for all intercepted menu selection events to item manager 42*c*. Rather, it only passes those identifications for menu selections that effect the opening or closing of files, such as FILE-NEW, FILE-OPEN, FILE-CLOSE. Those skilled in the art will, of course, appreciate that MENU_ID's for all or other menu selection events occurring in applications program 42*a* can be passed to item manager 42*c*.

In step (3), the item manager 42*c* determines which processes—other than that in which the menu selection event was detected—are registered for notification of menu selection events. This is determined from the process/data synchronization structure 44, which identifies processes registered for notification of such events, as discussed above.

In step (4), the item manager 42*c* notifies each of the interested registered processes 46, 48 of the detected menu selection event. Particularly, the item manager transmits the MENU_ID value to each of the registered applications programs 46*a*, 48*a*. Such transmission can be accomplished using traditional inter-process communication (IPC) techniques, such as provided by the Windows 95 function SendMessage. Although all of the registered processes can be identified simultaneously, e.g., by a "broadcast" communication, a preferred embodiment of the invention notifies the registered processes serially. Each notified applications program 46*a*, 48*a* can respond to the notification, e.g., by opening or closing a corresponding file, creating a corresponding database, etc.

Once the registered processes have been notified, the menu manager 42*b* permits the process in which the menu selection event was detected (i.e., applications program 42*a*) to continue. To this end, menu manager 42*b* invokes the windowing API function that was originally called by that program 42*a* but that was intercepted by the same-named menu manager interceptor routine.

Synchronization via Item Selection, Addition, Deletion

Figure 4:
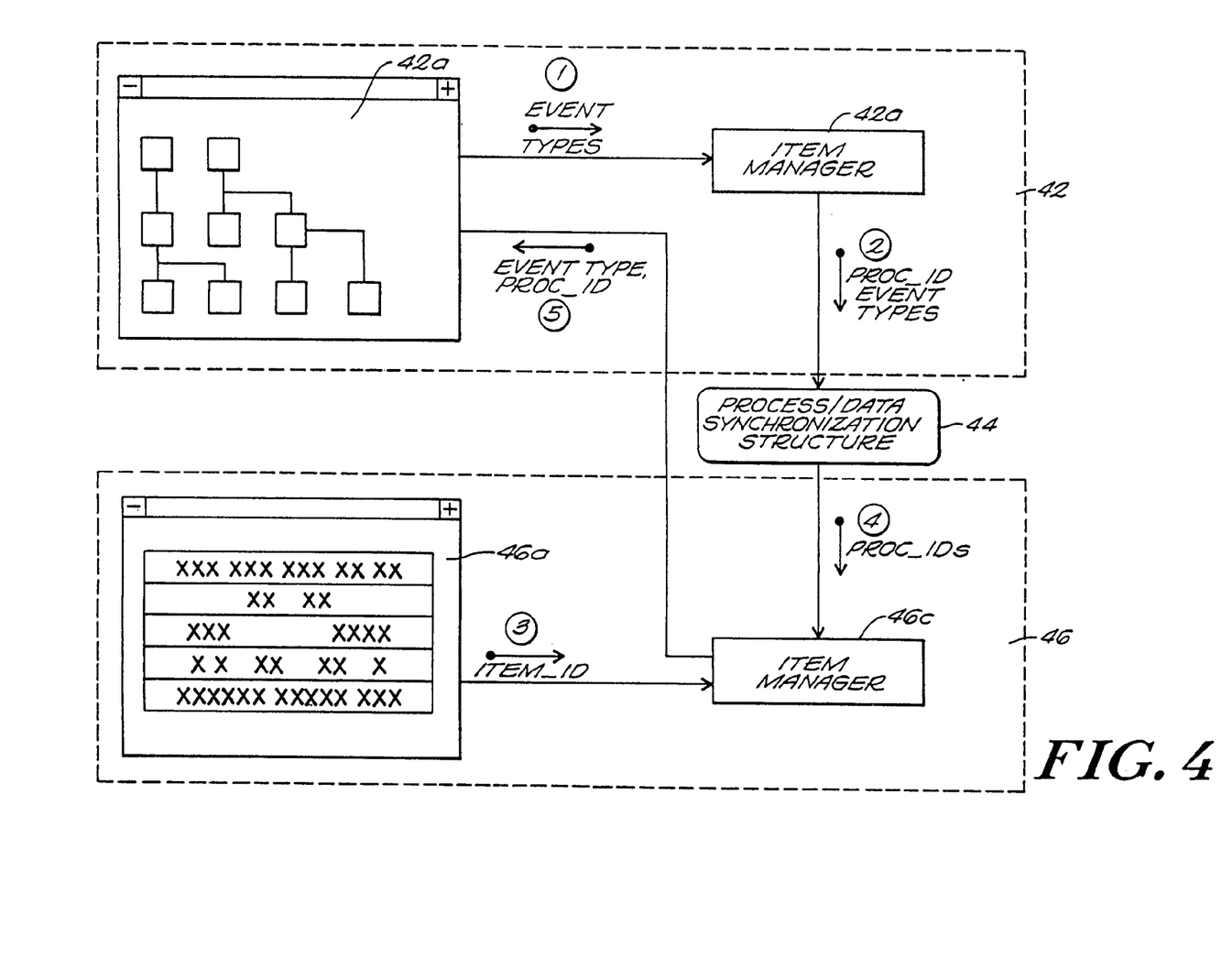
FIG. 4 depicts an item selection synchronization sequence in a method according to the invention.

FIG. 4 depicts a sequence for synchronizing processes 42, 46 based on an item-specific event (e.g., an item selection, addition or deletion) occurring in one of the processes, to wit, application program 46*a*. As noted above, the methods described herein can be extended to the other processes, e.g., process 48, as well.

In step (1), the applications program 42*a* invokes item manager 42*c* to register the program 42*a* for notification of specified item-specific events. The illustrated embodiment permits such an applications program to register for item selection, addition or deletion. Other embodiments of the invention can permit registration for notification of other item-specific events, such as highlighting, inactive/active state, etc.

In step (2), the item manager 42*c* stores in the process/data synchronizing structure 44 an identification of the process 42 (or of the applications program 42*a*), along with an indication of the types of item-specific events for which it is to be notified. The process/data synchronization structure 44 is defined as described above.

In step (3), the item manager 46c associated with process 46 detects an item-specific event (e.g., an item selection, addition or deletion) in corresponding applications program 46a. As discussed above, such detection is based on interception of routines in the windowing API of the operating system that identify objects selected, added or deleted by the user in the applications program 46a.

An identification of the specific item chosen by the user is reflected by a value ITEM_ID assigned and transmitted by the applications program 46a to the item manager 46c. In a preferred embodiment of the invention, ITEM_ID has a unique value representing the specific item chosen by the user or assigned directly by the applications program 46a. Those skilled in the art will, of course, appreciate that ITEM_ID may be assigned in other ways, preferably, that uniquely identify each item among all of the registered processes.

In step (4), the item manager 46c determines which processes—other than that in which the item-specific event was detected—are registered for notification of item-specific events. This is determined from the process/data synchronization structure 44, which (as discussed above) identifies processes registered for notification of such events.

In step (5), the item manager 46c notifies each of the registered processes of the detected item specific event. Particularly, the item manager 46c transmits the ITEM_ID (s) affected by the event to each of the registered applications programs 42a. Such transmission can be accomplished using traditional inter-process communication techniques, as discussed above. Each notified applications program 42a can respond to the notification, e.g., by selecting, adding or deleting the corresponding item in its own display window.

In embodiments where the applications programs maintain respective data stores reflecting, e.g., the content of a common data store, e.g., data store 40 of digital data processor 32 (FIG. 1), a notified applications program 42a can respond to notification to update its respective data store.

Once the registered processes have been notified, the item manager 46b permits the process in which the item-specific event was detected (i.e., applications program 46a) to continue.

Synchronization via Data Transfer Operations

Figure 5:
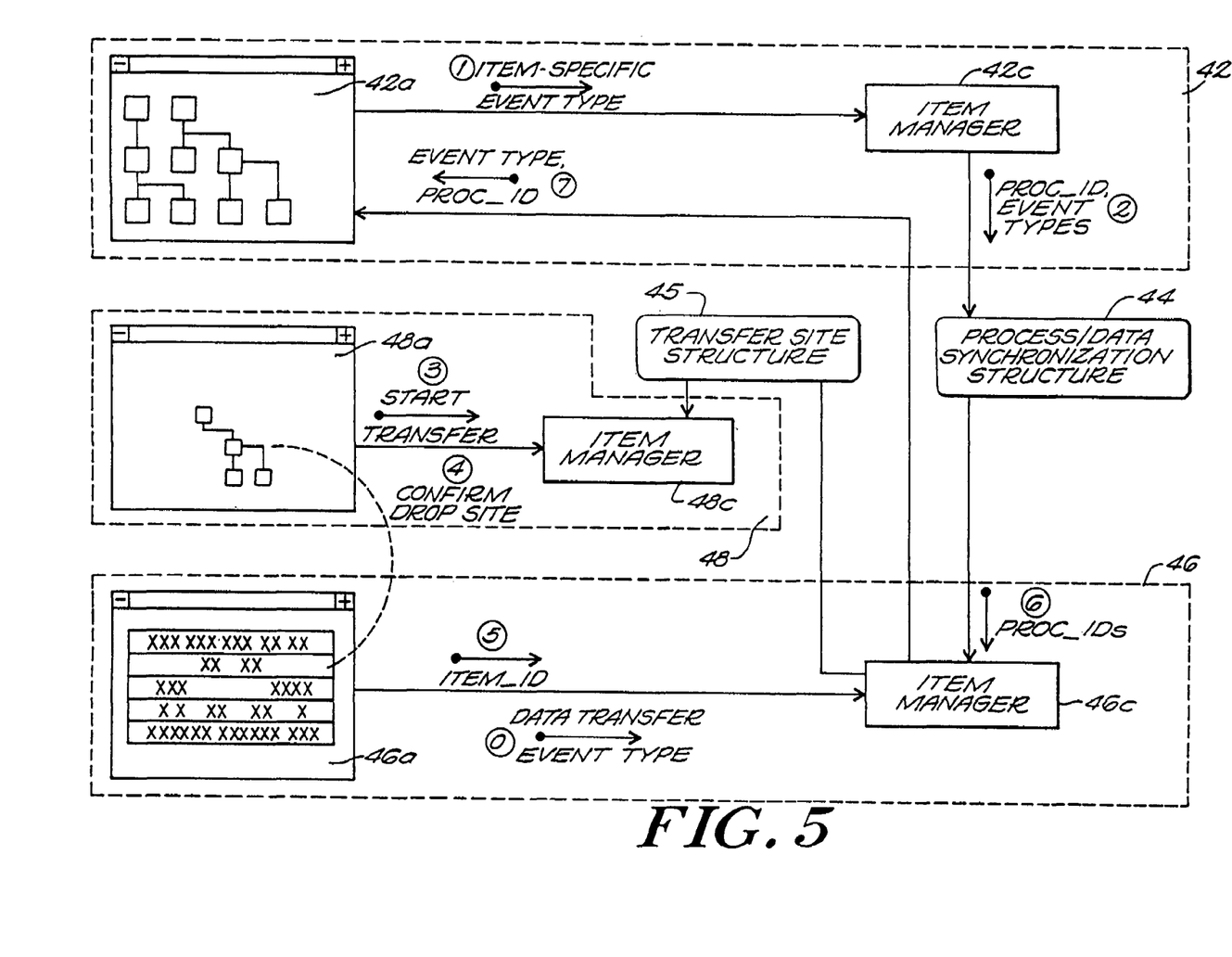
FIG. 5 depicts a drag-and-drop synchronization sequence in a method according to the invention.

FIG. 5 depicts a sequence for synchronizing processes 42, 46 based on data transfer events, such as a drag-and-drop events and/or cut-and-paste events, occurring between two of the processes, to wit, applications program 48a and applications program 46a.

At the outset, each applications program that is a potential recipient of a data transfer operation registers with its respective item manager (i) the types of data transfers that program can receive (e.g., drag-and-drop, cut-and-paste, etc.), (ii) the preferred format in which data is to be transferred, and (iii) for programs registered for drag-and-drop, the valid drop sites. This is illustrated in step(0), wherein applications program 46a registers with item manager 46c to receive drag-and-drop transfers.

In steps (1)–(2), the other applications programs, e.g., 42a, utilizes their corresponding item managers, e.g., 42c, to register for notification of item-specific events. This ensures that the program 42a will be notified of item additions resulting from drag-and-drop data transfers received by other programs, e.g., 46a.

In step (3), the item manager 48c associated with the applications program 48a in which a drag-and-drop event is initiated detects the start of that event. Such detection is based on interception of mouse "down" and mouse "move" notifications by that program 48a from the windowing operating system.

In step (4), the item manager 48c confirms the drop site selected by the user for the drag-and-drop event. As discussed above, valid drop sites for each registered process are stored in the transfer site structure 45. Comparing the information in that instruction with the information supplied by the operating system vis-a-vis the identity of the recipient process 46 and the drop site selected by the user, the item manager 48c permits or aborts the drag-and-drop event. In the event that the event is permitted to continue, the item manager 48c formats the transferred data in the format specified for the recipient program 46a in the transfer site structure 45. The formatted data is then transferred using traditional inter-process communication (IPC) techniques (e.g., SendMessage) of the type discussed above. Once that data is received by the recipient, to wit, applications program 46c, it adds the specified items in the format provided.

Once the data transfer is completed, the item manager 46c associated with the recipient applications program 46a notifies the other processes of the additional item. This is accomplished in steps (5)–(7) of FIG. 5 in the same manner discussed above in connection with steps (3)–(5) of FIG. 4.

Though the illustrated embodiment concerns drag-and-drop events, those skilled in the art will appreciate that it can be readily applied to other types of inter-applications data transfers, for example, cut-and-paste transfers (e.g., where selected item(s) in a first application are "clipped" to the clipboard and, subsequently, copied into a second application).

Synchronization Illustrated

FIGS. 6–9 depict screen dumps illustrating effects of synchronizing processes in accord with the board's discussed above.

Figure 6A:
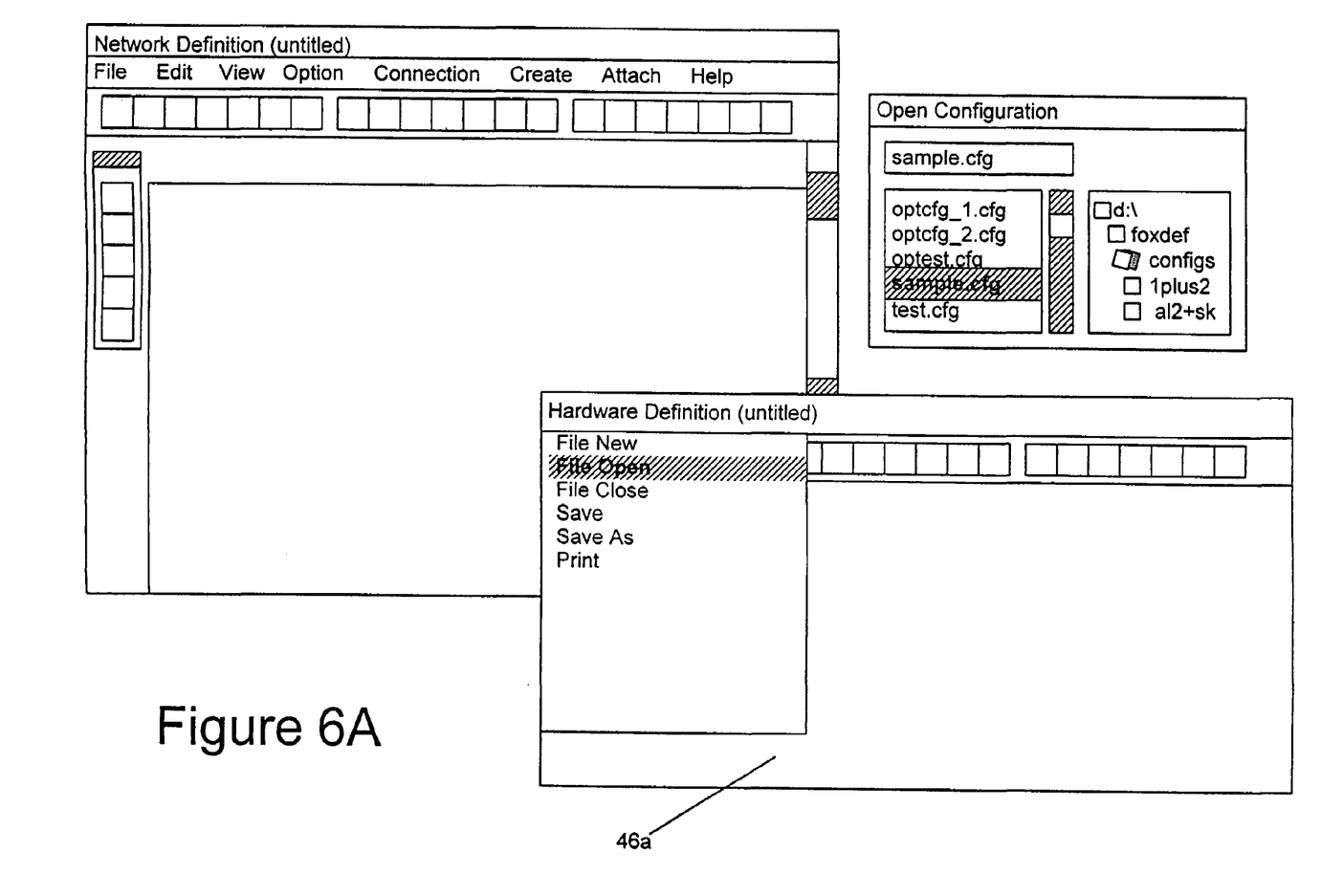
FIGS. 6A–6B illustrate the effect of menu selection synchronization in a method according to the invention.
Figure 6B:
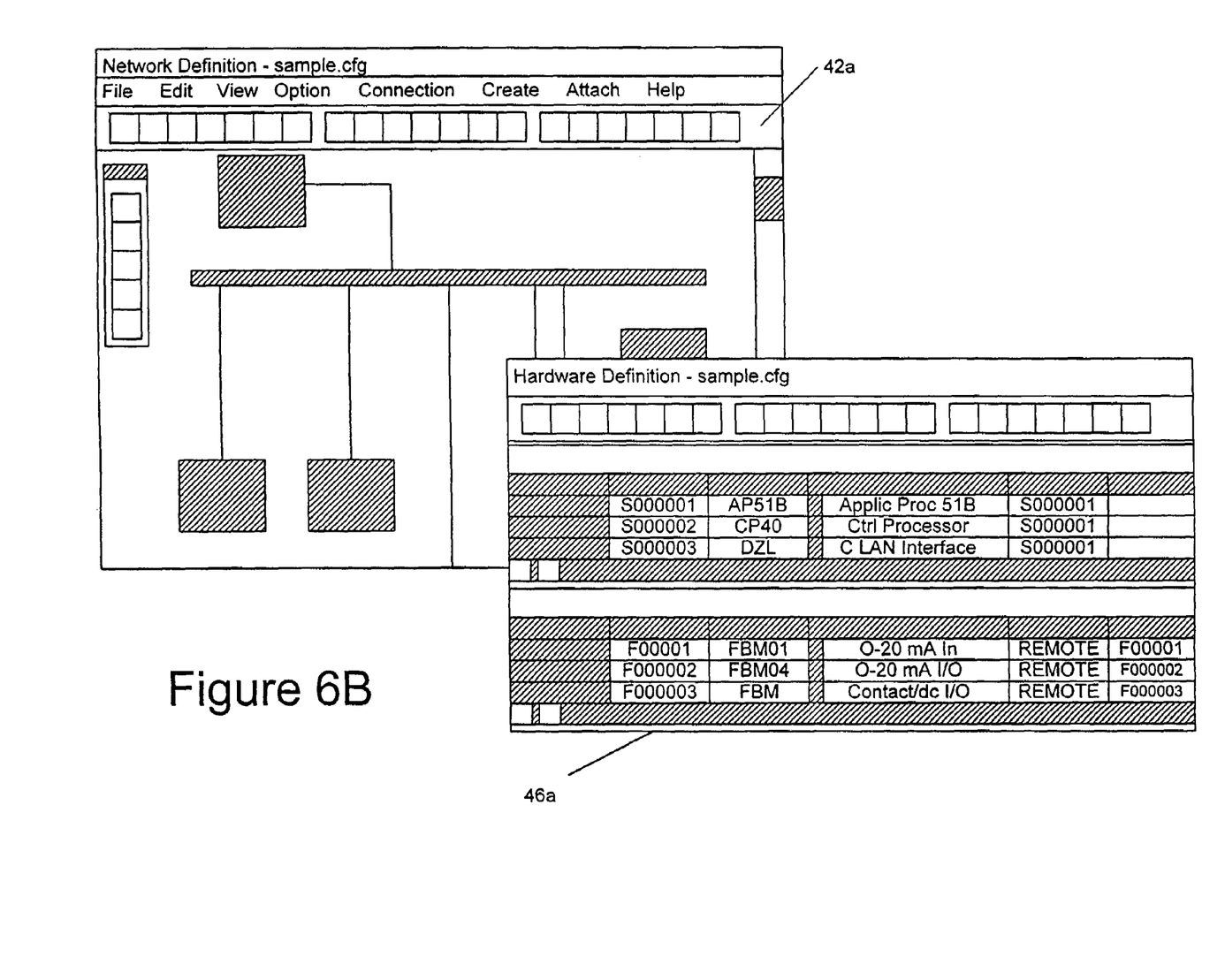

Referring to FIGS. 6a–6b, there is shown the effects of synchronizing applications program 42a based on a menu selection event occurring in another applications program 46a. More particularly, as shown in FIG. 6a, the two applications programs 42a, 46a are executing simultaneously on a digital data processing system, e.g., in the manner of the processes executing on processor 30 of FIG. 1. With continued reference to FIG. 6a, the user (not shown) selects a menu option—particularly, a FILE-OPEN option—in applications program 46a. In accord with the methodologies discussed above, e.g., in connection with FIG. 3, applications program 42a is notified of the selection. As shown in FIG. 6b, that applications program 42a responds to the notification by opening a corresponding file and displaying its data.

Figure 7A:
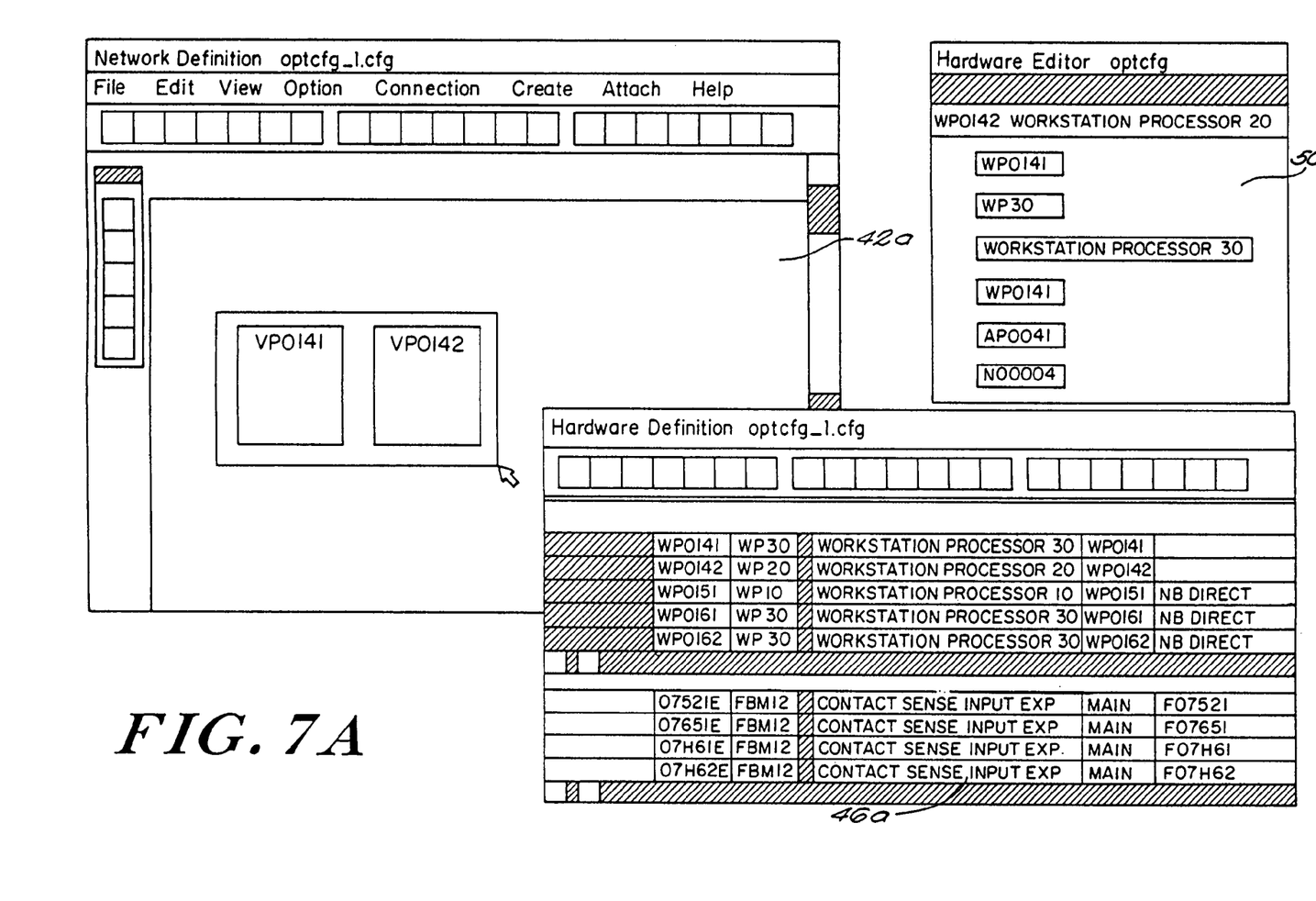
FIGS. 7A–7B illustrate the effect of item selection synchronization in a method according to the invention.
Figure 7B:
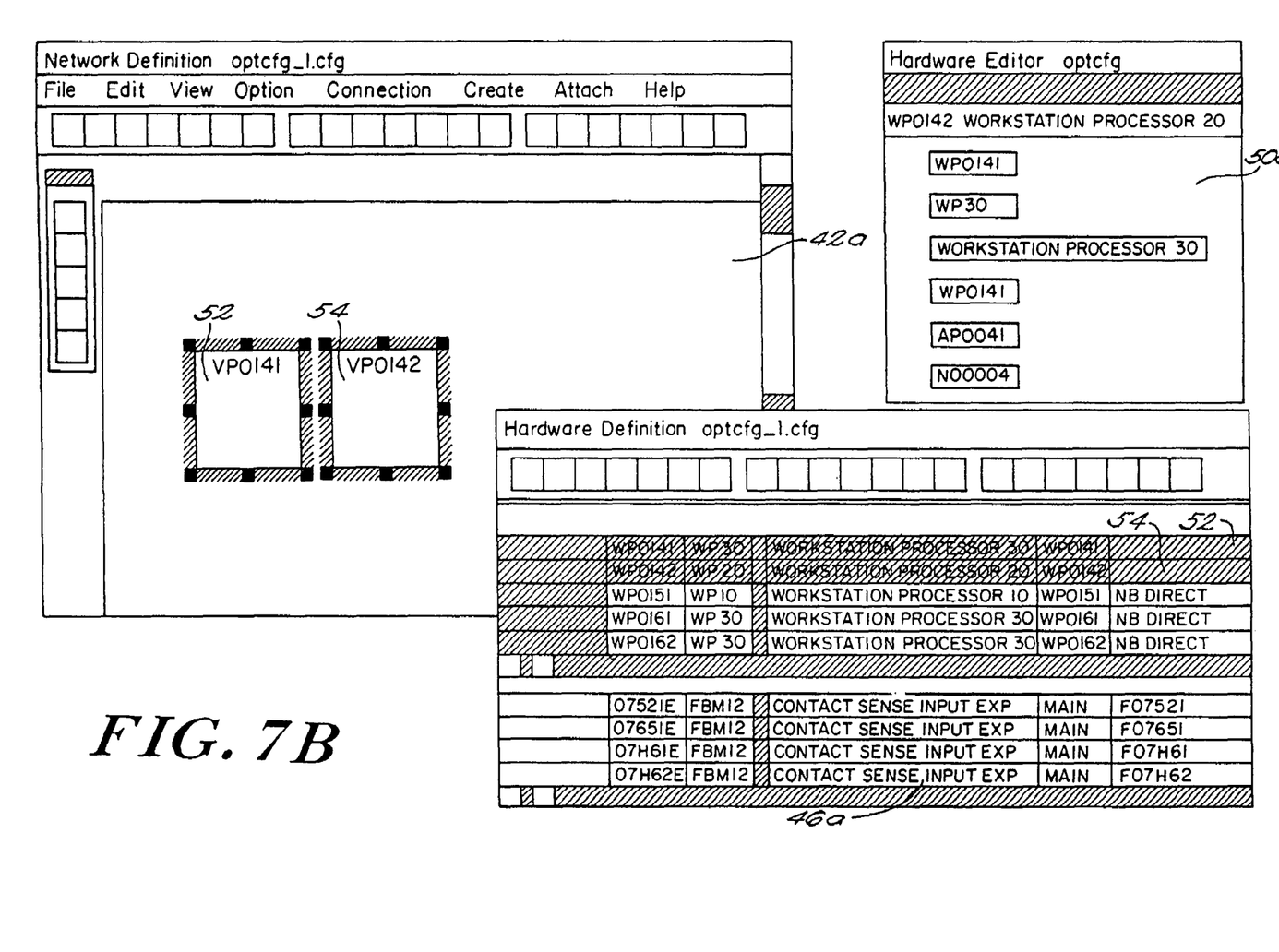

Referring to FIGS. 7a–7b, there is shown the effects of synchronizing applications programs 46a, 50a based on an item selection event occurring in applications program 42a. More particularly, as shown in FIG. 7a, the three applications programs 42a, 46a, 50a are executing simultaneously on a digital data processing system. Those programs are also executing with respect to common data, although they display it in differing formats. As shown in FIG. 7a, the user (not shown) selects two items 52, 54 displayed by applications program 42a. In accord with the methodologies discussed above, e.g., in connection with FIG. 4, applications programs 46a, 50a are notified of the selection. As shown in FIG. 7b, those applications programs 46a, 50a respond to the notification by selecting or highlighting corresponding items displayed by them.

Figure 8A:
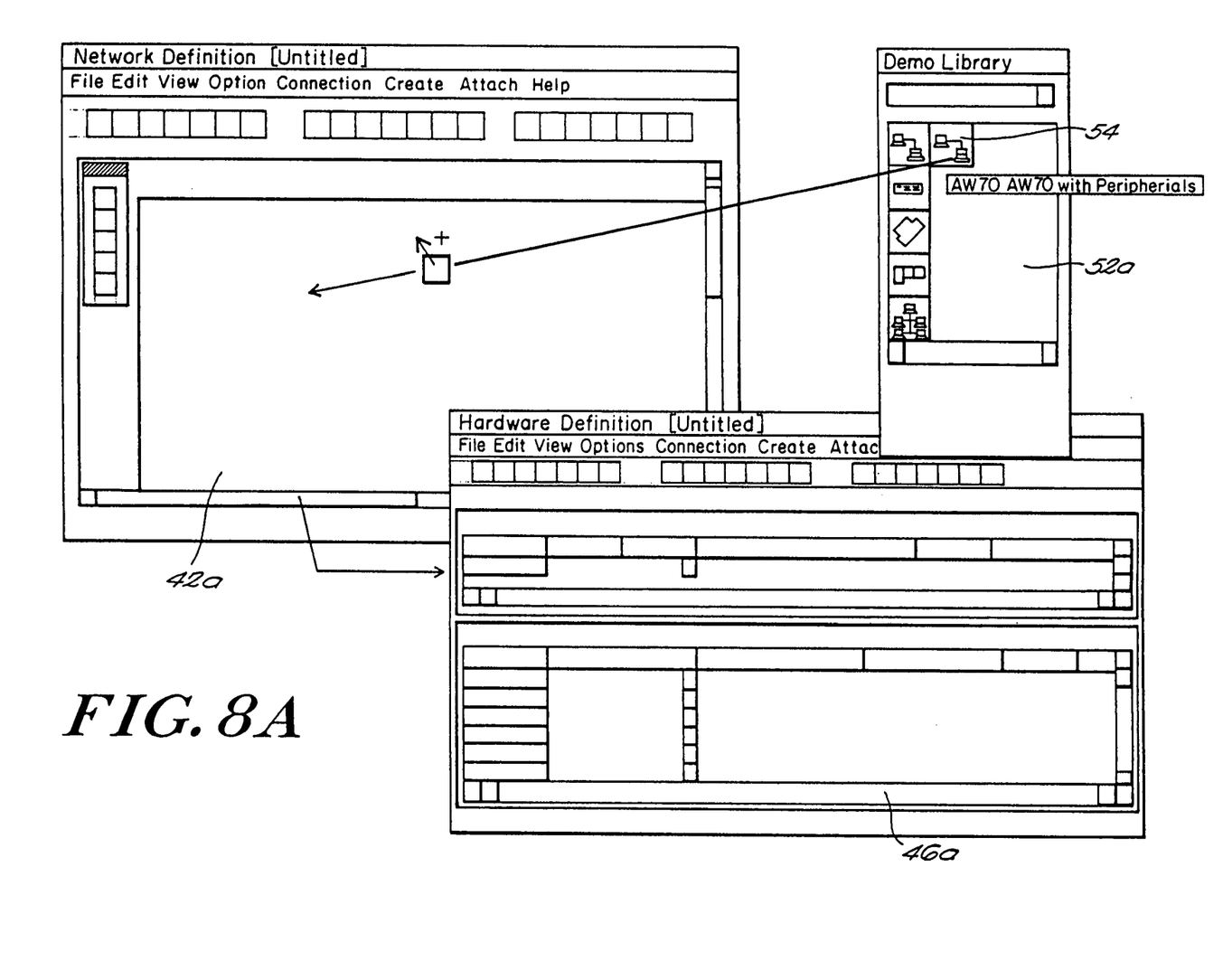
FIGS. 8A–8B illustrate the effect of drag-and-drop synchronization in a method according to the invention.
Figure 8B:
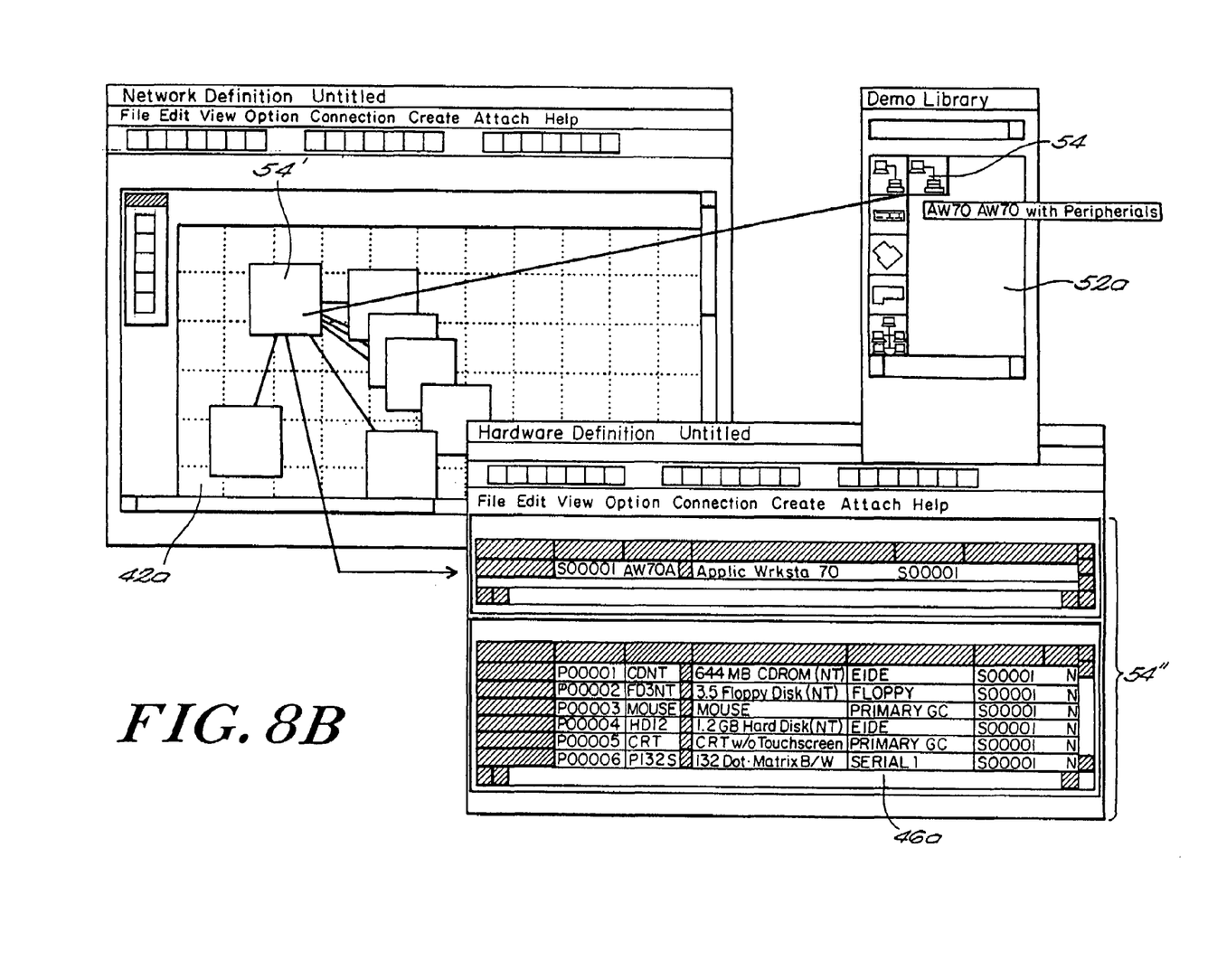

Referring to FIGS. 8a–8b, there is shown the effects of synchronizing applications program 46a based on a dragand-drop event occurring between two other processes 52a, 42a. More particularly, as shown in FIG. 8a, the three applications programs 42a, 46a, 52a are executing simultaneously on a digital data processing system. As shown in FIG. 8a, the user (not shown) drags items 54 displayed by applications program 52a to applications program 42a. In accord with the methodologies discussed above, e.g., in connection with FIG. 5, the items are formatted and the drop site confirmed before it is transferred to the recipient applications program 42a. Moreover, the applications program 46a is notified of the event, particularly, of the addition of items 54' single prime, not double prime to applications program 42a. As shown in FIG. 8b, that applications program 46 responds to the notification by adding a corresponding items 54' to its display.

Articles of Manufacture

Figure 9:
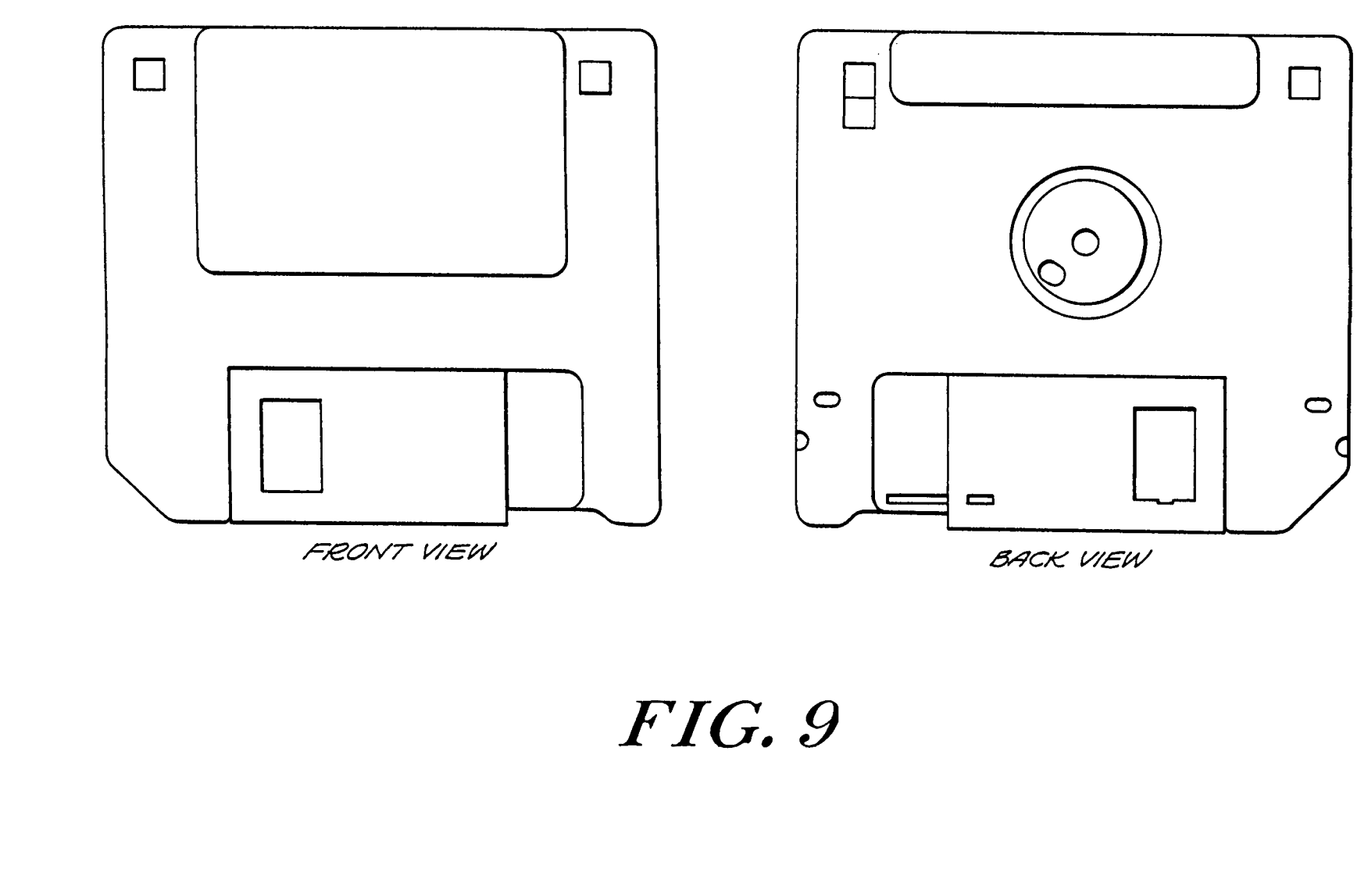
FIG. 9 depicts an article of manufacture embodying a program intended to cause a computer to perform methods according to the invention.

FIG. 9 depicts an article of manufacture, to wit, a magnetic diskette, composed of a computer usable media, to wit, a magnetic disk, embodying a computer program that causes digital data processing system 10, or other such digital data processing apparatus, to operate in accord with the methods described above. The diskette is shown in front view and back view. It is of conventional construction and has the computer program stored on the magnetic media therein in a conventional manner readable, e.g., via a read/write head contained in a diskette drive of image analyzer 40. It will be appreciated that diskette is shown by way of example only and that other articles of manufacture comprising computer usable media on which programs intended to cause a computer to execute in accord with the teachings hereof are also embraced by the invention.

Conclusion

Described herein are improved methods, systems and articles of manufacture for digital data processing meeting the objects set forth above. It will be appreciated that the embodiments illustrated and discussed herein are merely examples of the invention and that other embodiments incorporating modifications thereto fall within the scope of the invention, of which we claim:

We claim:

1. An event-driven method for synchronizing plural processes that process information relating to process control, the method comprising
   A. registering at least one process of said plural processes for notification of menu selection events in another of said plural processes, each of the selected and other processes processing information regarding a process control system of a type used to control a manufacturing process,
   B. executing the plural processes on a common digital data processor with respect to any of common data and corresponding data (hereinafter, "common data") and generating with each such process a different respective graphical user interface display,
   C. detecting selection of a menu item in a graphical user interface in one of the plural processes,
   D. identifying one or more processes, other than that in which the menu item was selected, registered for notification of menu selection events and notifying them that the menu item was selected, and
   E. responding to such notification by selectively modifying the graphical user interface display generated within each of the notified processes and selectively executing, within each of the notified processes with respect to the common data, an operation in accord with the selected menu item.

2. A method according to claim 1, comprising wherein step (C) comprises detecting selection of the menu item by intercepting a selected call made by the process in which such selection was made.

3. A method according to claim 1, wherein step (B) includes generating with a first one of the plural processes a graphical user interface display of the common data in a tabular format and generating with a second one of the plural processes a graphical user interface display of the common data in a graph format.

4. A method according to claim 1, comprising the step of responding to notification of a file-open menu selection event for accessing, within each of the notified processes, a file corresponding to that opened by the file-open menu selection event in the process in which it was made.

5. A method according to claim 1, comprising the step of responding to notification of a file-close menu selection event for terminating access, within each of the notified processes, to a file corresponding to that to which access is terminated by the menu file-close menu selection event in the process in which it was made.

6. A method according to claim 1, wherein step (C) comprises
   detecting selection of the menu item by intercepting a selected call made by the process in which such selection was made,
   invoking, subsequent to the intercepting step, any of a routine to which the intercepted call was directed.

7. A method according to claim 1, wherein step (D) comprises the step of transferring to each of the notified processes a menu selection signal identifying the selected menu item.

8. An event-driven method for synchronizing plural processes that process information relating to process control, the method comprising
   A. executing the plural processes on plural interconnected digital data processors,
   B. registering at least one process of said plural processes for notification of menu selection events in a second of of said plural processes, each of the selected and other processes processing information regarding a process control system of a type used to control a manufacturing process,
   C. executing the plural processes with respect to any of common and corresponding data (hereinafter, "common" data) and generating with each such process a different respective graphical user interface display,
   D. detecting selection of a menu item in a graphical user interface in one of the plural processes,
   E. identifying one or more processes, other than that in which the menu item was selected, registered for notification of menu selection events and notifying them that the menu item was selected, and
   F. responding to such notification by selectively modifying the graphical user interface display generated within each of the notified processes and selectively executing, within each of the notified processes and with respect to the common data, an operation in accord with the selected menu item.

9. A method according to claim 8, wherein step (E) comprises the step of notifying the one or more registered processes of (i) an identity of the process in which the menu item was selected, (ii) a type corresponding to the detected menu selection.

10. A method according to claim 8, wherein step (E) comprises the step of notifying the one or more registered processes for any of initiating and terminating access to a file.

11. An event-driven method for synchronizing plural processes that are executing on a common digital data processor and that process information relating to process control, the method comprising
- A. registering at least one process of said plural processes for notification of item-specific events in another of said plural processes, each of the selected and other processes processing information about regarding a process control system of a type used to control a manufacturing process,
- B. executing the plural processes on said common digital data processor with respect to any of common data and corresponding data (hereinafter, "common data") and generating with each such process a different respective graphical user interface display,
- C. detecting an item-specific event in one of the plural processes and modifying the graphical user interface display generated by that process in accord with that event,
- D. the process in which the item-specific event occurred selectively (i) identifying one or more processes, other than that in which the item-specific event was detected, registered for notification of item-specific events and (ii) providing notification to those notified processes of the detected event,
- E. responding to such notification by modifying the graphical user interface display generated by each of the notified processes with respect to the common data in accord with the detected event.

12. A method according to claim 11, in which stop (B) includes wherein step (B) includes generating with a first one of the plural processes a graphical user interface display of the common data in a tabular format and generating with a second one of the plural processes a graphical user interface display of the common data in a graph format.

13. A method according to claim 11, in which step (B) includes the step of detecting as an item-specific event any of a selection of an item displayed by the graphical user interface, creation of an item, updating a value of an item, and deletion of an item.

14. A method according to claim 13, wherein step (E) includes responding to such notification for taking action on an item within each of the notified processes in accord with that taken on a corresponding item in connection with the detected item-specific event in the process in which it was detected.

15. An event-driven method for synchronizing plural processes that process information relating to process control, the method comprising
- A. executing the plural processes on plural interconnected digital data processors,
- B. registering at least one process of said plural processes for notification of item-specific events in a second of said plural processes, each of the selected and other processes processing information about regarding a process control system of a type used to control a manufacturing process,
- C. executing the plural processes with respect to any of common data and corresponding data (hereinafter, "common data") and generating with each such process a different respective graphical user interface display,
- D. detecting an item-specific event in one of the plural processes and modifying the graphical user interface display generated by that process in accord with that event
- E. the process in which the item-specific event occurred selectively (i) identifying one or more processes, other than that in which the item-specific event was detected, registered for notification of item-specific events and (ii) providing notification to those notified processes of the detected event,
- F. responding to such notification by modifying the graphical user interface display generated by each of the notified processes with respect to the common data in accord with the detected event.

16. A method according to claim 15, wherein step (E) comprises the step of notifying the notified processes of (i) an identity of the process in which the item-specific selection event was detected, (ii) a type of the item-specific selection event.

17. A method according to claim 15, comprising the steps of
- executing the plural processes and generating with each a respective graphical user interface display, and
- detecting a data transfer event between any of the plural processes and modifying the graphical user interface display generated by that process in accord with that event
- identifying one or more processes, other than a recipient of the data transfer event, registered for notification of item-specific events and providing notification to them of addition of an item to a process, and
- responding to such notification by modifying the graphical user interface display generated by each of the notified processes in accord with the detected event and for taking action within each of the notified processes in accord with the addition of an item to the recipient of the data transfer event.

18. A method according to claim 17, wherein the data transfer event includes any of a drag-and-drop event and a copy-and-paste event.

19. A method according to claim 17, comprising the steps of
- executing to plural processes and generating with each a respective graphical user interface display, and
- detecting a drag-and-drop event between any of the processes,
- identifying one a more processes, other than a recipient of the drag-and-drop event, registered for notification of item-specific events and notifying them of addition of an item to a process, and
- responding to such notification for taking action within each of the notified processes in accord with the addition of an item to the recipient of the drag-and-drop event.

20. A method according to claim 19, comprising the steps of
- registering at least one process of said plural processes as recipients of drag-and-drop events and identifying valid drop sites within those processes, and
- responding to detection of a drag-and-drop event for verifying validity of a drop site for that event in accord with the registration of recipients thereof.

* * * * *